United States Patent [19]

Shimamura

[11] 4,079,371
[45] Mar. 14, 1978

[54] RATE CONVERTER FOR DIGITAL SIGNALS HAVING A NEGATIVE FEEDBACK PHASE LOCK LOOP

[75] Inventor: Tadao Shimamura, Tokyo, Japan

[73] Assignee: Nippon Electric Company, Ltd., Tokyo, Japan

[21] Appl. No.: 688,228

[22] Filed: May 20, 1976

[30] Foreign Application Priority Data

May 24, 1975  Japan .................................. 50-62811

[51] Int. Cl.$^2$ .............................................. G06F 5/06
[52] U.S. Cl. ......................... 340/347 DD; 179/15 AF
[58] Field of Search ..................... 179/15 BV, 15 AF; 340/347 DD, 172.5

[56] References Cited

U.S. PATENT DOCUMENTS

| | | | |
|---|---|---|---|
| 3,136,861 | 6/1964 | Mayo | 179/15 AF |
| 3,504,287 | 3/1970 | Deregnaucourt | 179/15 AF |
| 3,663,760 | 5/1972 | De Witt | 179/15 AF |
| 3,806,654 | 4/1974 | Dooley | 179/15 AF |
| 3,821,478 | 6/1974 | Hillman | 179/15 AF |

*Primary Examiner*—Charles D. Miller

*Attorney, Agent, or Firm*—Ostrolenk, Faber, Gerb & Soffen

[57] ABSTRACT

An arrangement responsive to input digital signals for producing output digital signals at a higher rate together with stuffing pulses comprises a first frequency divider responsive to input clock pulses defining the rate of the input signals for producing write-in pulses for storing the input digital signals in a memory. A voltage controlled oscillator produces output clock pulses at the higher rate, which pulses are supplied directly and through a circuit responsive to the output clock pulses for supplying stuffing-pulse-position specifying pulses to a second frequency divider for producing read-out pulses for making the memory produce the output signals. A controller responsive to the input clock, output clock, and position specifying pulses and coupled to the first and second frequency dividers establishes a difference in phase between the write-in and read-out pulses which lies in a range wherein a phase lock loop means responsive to the phase difference for controlling the oscillator always carries out negative feedback to the oscillator.

6 Claims, 6 Drawing Figures

RATE CONVERTER FOR DIGITAL SIGNALS HAVING A NEGATIVE FEEDBACK PHASE LOCK LOOP

BACKGROUND OF THE INVENTION

This invention relates to a rate converter for digital signals including a phase lock loop.

A rate converter for digital signals is an arrangement responsive to a series of input clock pulses defining first time slots and a series of input digital signals supplied to the arrangement at the respective first time slots for producing a series of output clock pulses defining second time slots including excess time slots and a series of output digital signals at the respective ones of the second time slots less the excess time slots. The input digital signals are representative of information being transmitted. The excess time slots are of a predetermined number in each predetermined period of time, such as in each frame period. The predetermined number may be one. The total number of second time slots in the predetermined period less the excess time slots in the predetermined period are equal in number to the first time slots in the predetermined period. The output digital signals are representative of the information carried by the input digital signals. Therefore, stuffing pulses may be transmitted from the arrangement at the respective excess time slots so that an output signal pulse train produced by the arrangement may become a stuffed pulse train described by V. I. Johannes and R. H. McCullough in IEEE Transactions on Communication Technology, Vol. COM-14, No. 5 (October, 1966), pages 562–568, particularly on page 563, under the title of "Multiplexing of Asynchronous Digital Signals Using Pulse Stuffing with Added-Bit Signaling."

As will later be described in more detail with reference to some of the accompanying drawings, a conventional arrangement of the type specified comprises a memory having a memory capacity greater in number than a predetermined number, a first frequency divider responsive to the input clock pulses for producing write-in pulse trains for use in storing the input digital signals in the memory, and a second frequency divider responsive to a series of input timing pulses for producing read-out pulse trains for use in making the memory produce the output digital signals. The output clock pulses are produced by a voltage controlled oscillator having a free running frequency approximately equal to the total number per unit time (i.e. per frame period) of the second time slots. Responsive to the output clock pulses, a counter, such as a frame counter, produces a series of excess-pulse-position specifying pulses for inhibiting application of the output clock pulses to the second frequency divider. Responsive to a difference in phase between the write-in and read-out pulse trains, phase lock means controls the voltage controlled oscillator to make the oscillator operate so that the phase difference is maintained approximately at zero. The phase lock means thus forms a portion of a phase lock feedback loop for the oscillator.

A rate converter of the type described is used in a digital communication system having a plurality of communication channels, $m + n$ in number where $m$ is greater than $n$, among which $m$ channels are used as operating or live channels, while no channels are preserved as stand-by channels, in order to raise the availability of the $m + n$ channels as a whole. The communication system comprises channel monitoring facilities, as called herein, for incessantly monitoring performance of each live channel and automatic switching devices operatively coupled to the monitoring facilities for switching a live channel to a stand-by as soon as the performance of the live channel is either degraded by a trouble or is otherwise adversely affected. The monitoring facilities comprise rate converters of the type described hereinabove in a transmission terminal station or on the transmitter side of a repeater station. Each rate converter is accompanied by means for placing pilot pulses or parity check bit pulses at the above-mentioned excess time slots to insert such stuffing pulses into the train of output digital signals. In a reception terminal station or on the receiver side of a repeater station, the monitoring facilities comprise means for detecting and stuffing pulses to determine the rate of code errors of each live and stand-by channel.

At an instant at which the performance of a live channel is found to be unsatisfactory, the live channel is switched to a stand-by one. A rate converter for the stand-by channel is supplied with the input clock pulses and input digital signals anew from the instant of changeover. The voltage controlled oscillator for the stand-by channel, which was operating up to the aforesaid instant at the free running frequency, is controlled by the phase lock means so that the phase of the output clock pulses series may be locked or pulled in to the phase of the input clock pulse series. It is, however, to be noted that the phase relation between the write-in and read-out pulses varies during the process of pull-in to frequently step out of a predetermined range of the phase relation. In this event, the digital signals stored in the memory by the write-in pulses are erroneously produced therefrom as the output digital signals by the read-out pulses to undesirably introduce code errors into the output signal pulse train. It is therefore necessary that pull-in be accomplished in the shortest possible period of time.

It should also be noted in conjunction with the above that each repeater station comprises a clock pulse regenerator having a phase lock loop. When the frequency or phase of the output clock pulse series produced by a rate converter of a preceding station rapidly varies due to quick response of the converter to the new input clock pulse series, the phase lock loop of the clock pulse regenerator can not follow the rapid variation to again undesirably introduce a large phase error into the regenerated clock pulse series and accordingly introduces code errors into the digital signal series transmitted from the repeater station either to another repeater station or to a reception terminal station. Particularly when the phase of the output clock pulse series is subjected to a large variation due to stepping-out of the phase relation from the predetermined range to another range where the phase lock loop of the rate converter carries out positive feedback, a large phase error is introduced into the regenerated clock pulse series. On the other hand, it is generally necessary in a communication system having a considerable number of successive repeater stations to avoid excessive accumulation of jitter in timing and consequently to render the noise bandwidth of the system narrow and the damping coefficient of the clock pulse regenerator phase lock loops large by providing the phase lock loops with a slow response to transients. As a result, the rate converter phase lock loop must also have a sufficiently slow response to transients. This requisite is contradictory to the requirements for the quick pull-in.

SUMMARY OF THE INVENTION AND OBJECTS

It is therefore an object of the present invention to provide a rate converter of the type described, which is capable of accomplishing the above-mentioned pull-in in a short period of time.

It is another object of this invention to provide a rate converter of the type described, which comprises a phase lock loop capable of always carrying out negative feedback.

It is a further object of this invention to provide a rate converter of the type described, which is capable of producing a series of output digital signals without an appreciable number of code errors as soon as a series of input clock pulses and a series of input digital signals are supplied thereto.

It is a still further object of this invention to provide a rate converter of the type described, wherein the phase lock loop has a sufficiently slow response to transients.

It is a yet further object of this invention to provide a rate converter of the type described, wherein an abrupt change will not occur in the frequency and phase of the output clock pulse series.

A rate converter for digital signals, namely, an arrangement specified at the beginning of the instant specification, to which this invention is applicable, comprises the elements also described at the beginning. In accordance with this invention, the rate converter further comprises control means coupled to the first and second frequency dividers and responsive to the input clock pulses, a series of output timing pulses produced by the voltage controlled oscillator as the output clock pulse series, and a series of timed pulses, namely, the excess-pulse-position specifying pulses, for always controlling the phase difference between the write-in and read-out pulse trains to lie within a range wherein the phase lock means carries out negative feedback to the voltage controlled oscillator.

BRIEF DESCRIPTION OF THE DRAWINGS

The above as well as other objects of the invention will become apparent when reading the accompanying description and drawings, in which.

DESCRIPTION OF THE PREFERRED EMBODIMENTS

Figure 1:
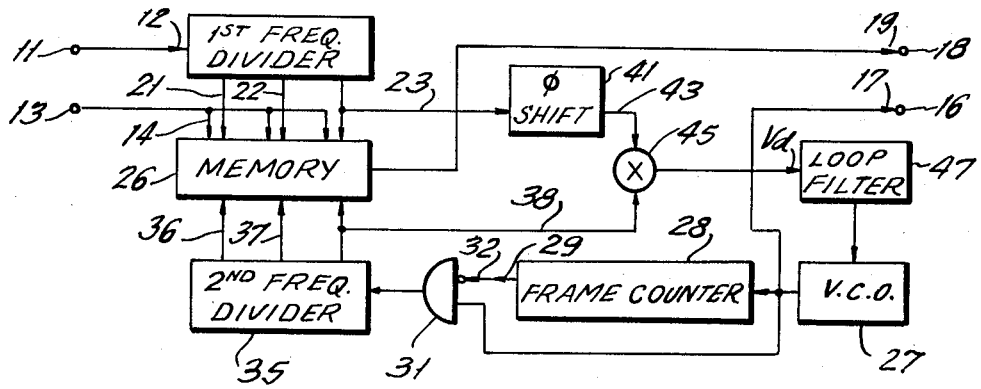
FIG. 1 is a block diagram of a conventional rate converter for operating on digital signals.
Figure 2:
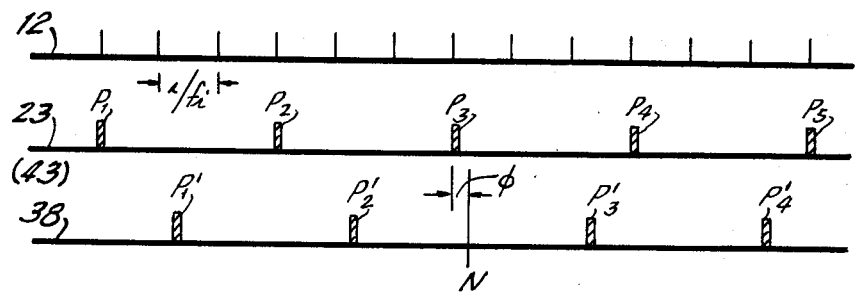
FIG. 2 shows several pulse series which appear in a conventional rate converter for digital signals as well as in a rate converter according to an embodiment of the present invention.

Referring at first to FIGS. 1 and 2, a conventional rate converter for digital signals will be described in order to facilitate an understanding of the instant invention. The rate converter comprises a clock input terminal 11 for a series of input clock pulses 12 of an input clock frequency $f_i$, a data input terminal 13 for a series input digital signals 14, a clock output terminal 16 for a series of output clock pulses 17 of an output clock frequency $f_o$ higher than the input clock frequency $f_i$, and a data output terminal 18 for a series of output digital signals 19. These pulse and signal series 12, 14, 17 and 19 have a common frame period known in the art. The input clock pulse series 12 specifies first time slots, $p$ in number in each frame period, one first time slot being of a duration of $1/f_i$. The input digital signals 14 are representative of information being transmitted and are supplied to the data input terminal 13 at the respective first time slots. The output clock series 17 defines second time slots, $p + q$ in number in each frame period. Among the second time slots, $q$ time slots in each frame period are herein called excess time slots. It is so arranged that the output digital signals 19 are supplied to the data output terminal 18 at the respective ones of the second time slots less the excess time slots and are representative of the information carried by the input digital signals 14.

Further referring to FIGS. 1 and 2, the input clock pulses 12 are supplied to a first frequency divider 20 for producing a plurality of frequency-divided input clock pulse trains 21, 22 and 23. Supplied with the frequency-divided input clock pulses 21 to 23 as write-in pulses, a memory 26 stores the input digital signals 14 therein. It is assumed here for simplicity of description that the number $q$ of the excess time slots in each frame period is one and that the memory 26 is a three-bit memory, namely, a memory having a memory storage capacity M equal to three. Under the aforesaid assumption, the write-in pulse trains 21 to 23 are three in number, namely, three-phase pulse trains, and have a repetition frequency equal to one-third of the input clock frequency $f_i/3$ and a cyclic phase difference of one first time slot $1/f_i$. The output clock pulses 17 are produced by a voltage controlled oscillator 27 having a free running frequency approximately equal to the output clock frequency $f_o$ and included in a phase lock loop described hereunder. In addition to the clock input terminal 16, the output clock pulses 17 are also supplied to a counter 28 for producing timed pulses 29 indicative of positions of the excess time slots. In the instant example wherein the number $q$ of the excess time slots in each frame period is one, the counter 28 may be a frame counter which produces only one frame pulse of about one first time slot duration $1/f_i$ in each frame period. The timed pulses 29 are supplied as inhibit pulses 32 to an INHIBIT gate 31 to suppress the corresponding pulses in the output clock pulse series 17 and to thereby produce a series of modified clock pulses in which pulses appear only at the respective ones of the second time slots less the excess time slots. Supplied with the modified clock pulses as input timing pulses, a second frequency divider 35 produces a plurality of frequency-divided timing pulse trains 36, 37 and 38 which are three in number in the example being illustrated and are similar to the write-in pulse trains 21 to 23. As best shown in FIG. 2, one of the write-in pulse trains, such as 23, comprises write-in pulses $P_1, P_2, P_3, P_4, P_5, \ldots$. Similarly, one of the frequency-divided timing pulse trains, such as 38, has pulses $P_1', P_2', P_3', P_4', \ldots$. It is surmised here that the excess time slot should be placed in the output clock pulse series 17 between the frequency-divided timing pulses $P_2'$ and $P_3'$ so that these pulses $P_2'$ and $P_3'$ are spaced by four second time slots Supplied with the frequency-divided timing pulses 36 to 38 as read-out pulses, the memory 26 produces the output digital signals 19 at a higher rate as compared with the rate at which input digital signals 14 are inserted into the memory. A phase shifter 41 preadjusted in the manner later described shifts the phase of one of the write-in pulse trains, such as 23, to produce a phase-shifted write-in pulse train 43.

Figure 3:
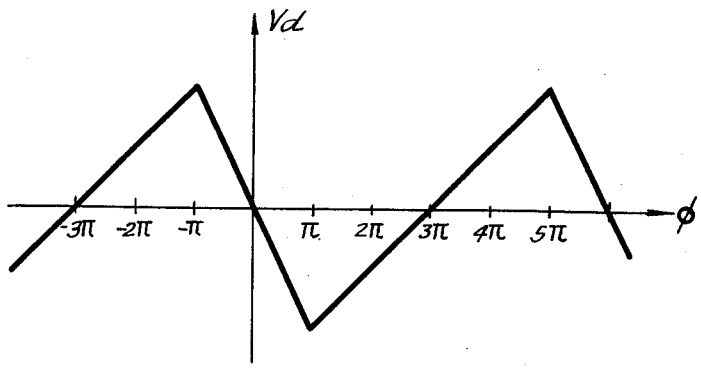
FIG. 3 shows a characteristic of a phase comparator.
Figure 4:
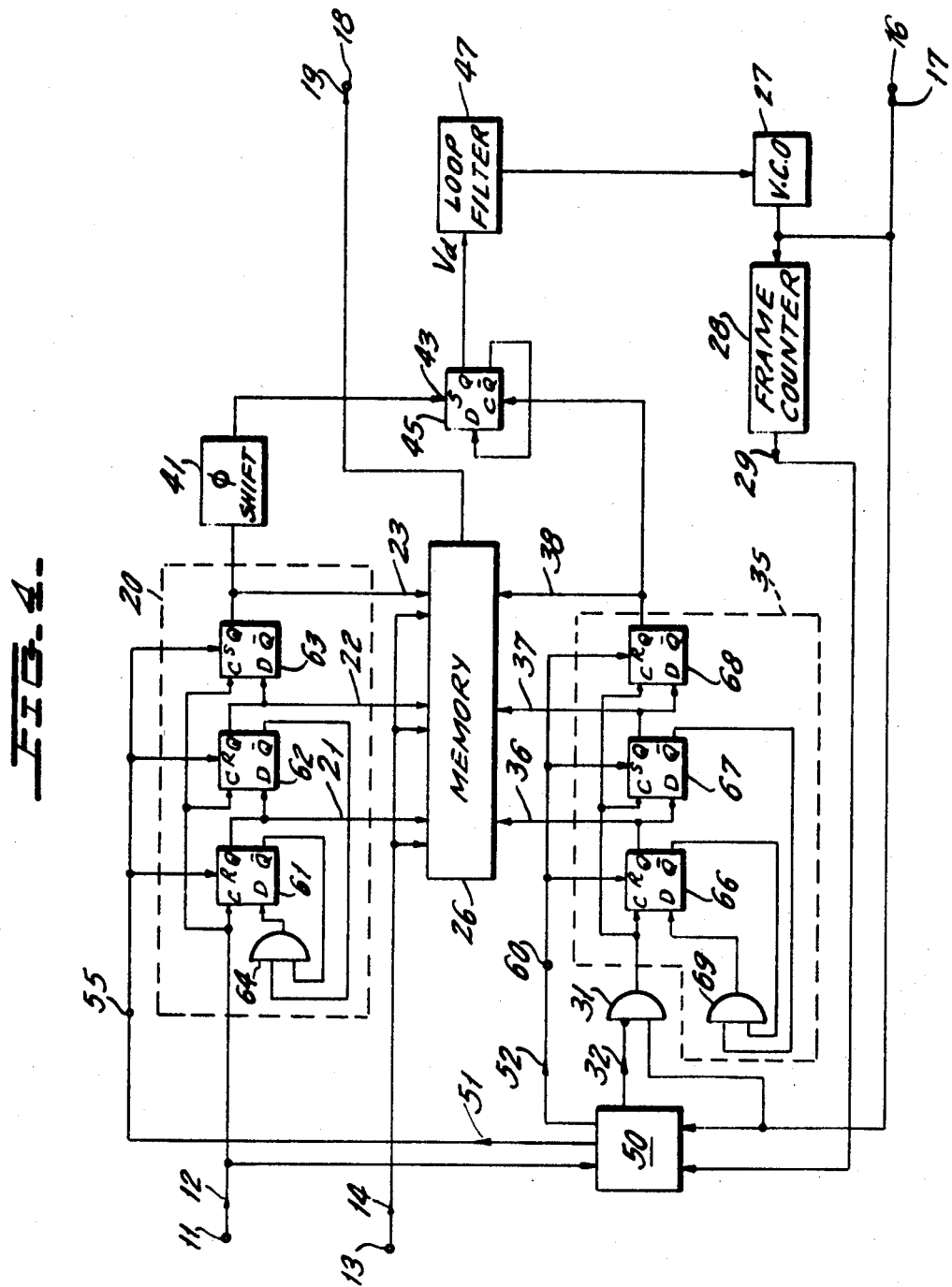
FIG. 4 is a block diagram of a rate converter according to a preferred embodiment of this invention.

Referring additionally to FIG. 4, the phase lock loop comprises a phase comparator 45 for comparing the phase-shifted write-in pulse train 43 and one of the read-out pulse trains, such as 38, to produce a comparator output signal $Vd$ representative of a difference $\phi$ in phase between the pulse trains 43 and 38. As will be described in conjunction with a preferred embodiment of this invention, the phase comparator 45 may be a flip-flop circuit of the D-type having a pair of input signals supplied to the set and clock terminals S and C with the $\overline{Q}$ output signal supplied back to the data terminal D to produce the phase comparator output signal $Vd$ at the Q terminal. In this event, the comparator output signal $Vd$ varies in the manner depicted in FIG. 3 versus the phase difference $\phi$ measured in terms of the angular frequency of the input clock pulses 12. Inasmuch as three write-in pulse trains 21 to 23 are produced by frequency division of the input clock pulse series 12, the characteristic of the phase comparator 45 has a period of $6\pi$. The phase lock loop further comprises a known loop filter 47 responsive to the comparator output signal Vd for supplying a control voltage to the voltage controlled oscillator 27. As illustrated in FIG. 2, the phase shifter 41 makes the phase difference $\phi$ between a point N of bisection between the read-out pulses $P_2'$ and $p_3'$ including the excess time slot therebetween and a corresponding one, for example, $P_3$, of the phase-shifted write-in pulses 43 as small as possible. Thus, phase lock means comprising the phase comparator 45 locks the output clock frequency $f_o$ to a frequency $(1 + q/p)f_i$ and also locks the phase difference between the input clock pulse series 12 and the modified clock pulse or input timing pulse series to a value determined within a range between $-\pi$ and $\pi$ by a frequency difference $\Delta f$ between the free running frequency of the voltage controlled oscillator 27 and the above-mentioned frequency $(1 + q/p)f_i$ and by a d.c. gain of the phase lock loop. It is to be pointed out in this connection that the rate converter will not produce correct output digital signal series 19 unless the phase difference $\phi$ described with reference to FIG. 2 is within a predetermined range $-(2\pi - \theta)$ and $(2\pi - \theta)$ where $\theta$ represents a tolerance for the speed limit of operation of the memory 26, the possible deviation of the circuit constants from nominal values, the unavoidable variation in the ambient temperature, and the like and that the parameters of the phase lock loop should be set so that the phase difference $\phi$ would not step out of the predetermined range insofar as the input clock frequency $f_i$ does not vary very much.

A conventional rate converter of the type thus far described has various defects as pointed out in the preamble of the instant specification. For example, the phase difference $\phi$ inevitably steps out of the predetermined range either when an input clock pulse series 12 is newly supplied to the clock input terminal 11 or when the clock pulse regenerator phase lock loop of a repeater station fails to follow a rapid variation in the frequency of an output clock pulse series produced by a rate converter of a preceding station.

Referring now to FIG. 4, a rate converter according to a preferred embodiment of this invention comprises similar elements designated with like reference numerals as in the conventional one and is characterized by a control pulse generator 50 supplied with the input and output clock pulse series 12 and 17 and the timed pulses 29 for maintaining the above-mentioned phase difference $\phi$ within a preselected range where the phase lock means always carries out negative feedback to the voltage controlled oscillator 27. More specifically, the control pulse generator 50 produces first and second control pulse trains 51 and 52 in the manner described hereinbelow. The first and second frequency dividers 20 and 35 are respectively provided with a first and a second preset terminal 55 and 60. The first and second control pulse trains 51 and 52 are supplied to the preset terminals 55 and 60 to preset the first and second frequency dividers 20 and 35, respectively, to place the phase difference $\phi$ in the above-mentioned preselected range. In the preferred embodiment, the first frequency divider 20 comprises first D-type flip-flop circuits 61, 62 and 63 associated with the memory locations of the memory 26, respectively, and connected in the manner depicted together with a first AND gate 64 to be cyclically settable by a specified point, such as the leading edge, of each of the input clock pulses 12 and to thereby supply the write-in pulses 21 to 23 to the respective memory locations. Similarly, the second frequency divider 35 comprises second D-type flip-flop circuits 66, 67 and 68 associated with the respective memory locations and connected as shown together with a second AND gate 69 to be cyclically settable by the input timing pulses, namely, the modified clock pulses, and to thereby supply the read-out pulses 36 to 38 to the respective memory locations. The first flip-flop circuits 61 to 63 are connected to the first preset terminal 55 so as to be preset by the first control pulses 51 in a first predetermined manner such that a predetermined one of the circuits, such as 63, thereof may produce a corresponding one of the write-in pulses 23. Likewise, the second flip-flop circuits 66 to 68 are connected to the second preset terminal 60 and are preset by the second control pulses 52 in a second predetermined manner such that one circuit thereof, such as 67, may produce a relevant one of the read-out pulses 37 that is related to the predetermined first flip-flop circuit 63 so as to place the phase difference $\phi$ in the preselected range. Responsive to the output clock and timed pulses 17 and 29, the control pulse generator 50 further produces the inhibit pulses 32 in the manner exemplified hereunder.

Figure 5:
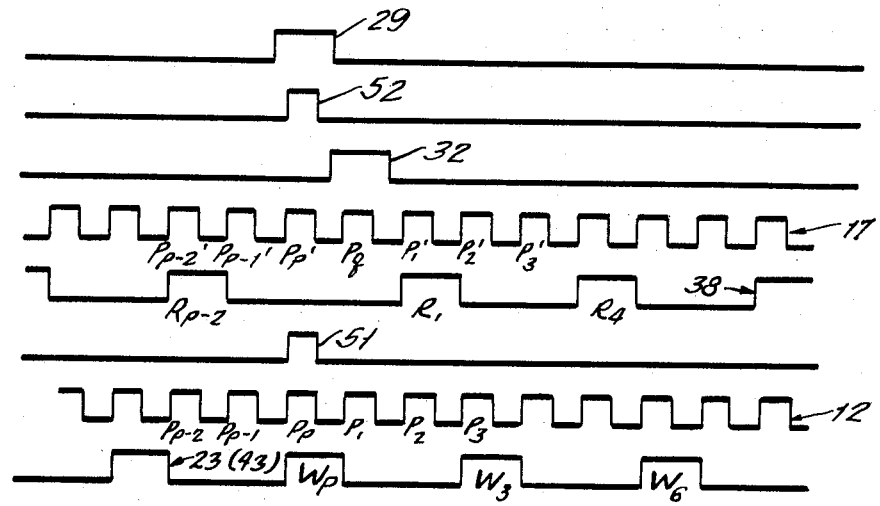
FIG. 5 schematically shows several pulse trains which appear in the rate converter depicted in FIG. 4.

Referring also to FIG. 5, it is now surmised that $q = 1$ and $M = 3$ and, at first, that it is possible to select an integral submultiple of the frame period $p$ expressed in terms of the first time slot as the number M of memory locations of the memory 26 so that the timed pulses 29 or inhibit pulses 32 may have definite relationships with respect to the write-in pulses 21 to 23 and read-out pulses 36 to 38. The control pulse generator 50 produces the first control pulses 51 by causing those $P_p$ of pulses . . . , $P_{p-2}$, $P_{p-1}$, $P_p$, $P_1$, $P_2$, $P_3$, . . . of the input clock pulse series 12 to pass therethrough which have their leading edges occurring during the interval of the timed or frame pulses 29. Among the output clock pulses . . . , $P_{p-2}'$, $P_{p-1}'$, $P_p'$, $P_q'$, $P_1'$, $P_2'$, $P_3'$, . . . , let the pulses $P_q$ specify the excess time slots. The second control pulses 52 are produced by causing those pulses $P_p'$ of the output clock pulse series 17 to pass through the pulse generator 50 which appear during the presence of the timed pulses 29. The inhibit pulses 32 are produced by giving a delay of one second time slot to the timed pulses 29. Although described as a portion of the pulse generator 50, the inhibit pulse generator serves in fact as means for supplying the timed pulses 29 as the inhibit pulses 32 to the INHIBIT gate 31. As has been broadly described hereinabove, the first preset terminal 55 is connected to the reset terminals R of first and second ones 61 and 62 of the first flip-flop circuits 61–63 and to the set terminal S of a third one 63 of the first flip-flop circuits. The second preset terminal 60 is connected to the reset terminal R of a first one 66 of the second flip-flop circuits 66–68, the set terminal S of a second one 67 thereof and the reset terminal R of a third one 68 thereto. When each of the first control pulses 51 is produced, the write-in pulse trains 21 to 23 are placed in the logic "0," "0," and "1" states, respectively. The write-in pulse train 25 is therefore comprised of logic "1" write-in pulses . . . , $W_p$, $W_3$, $W_6$, . . . , the suffixes corresponding to the suffixes to the input clock pulses 12 which are simultaneously supplied to the clock terminals C of the first flip-flop circuits 61 to 63. When each of the second control pulses 52 appears, the read-out pulse trains 36 to 38 are placed in the logic "0," "1," and "0" states, respectively. The read-out pulse train 38 remains in the logic "0" state during the next succeeding second time slot, when the output clock pulse $P_q$ to be supplied simultaneously to the clock terminals C of the second flip-flop circuits 66 to 68 is inhibited by the inhibit pulse 32, and switches to the logic "1" state at the time of the next following output clock pulse $P_1'$. The read-out pulse train 38 thus comprises logic "1" read-out pulses . . . , $R_{p-2}$, $R_1$, $R_4$, . . . with four second time slots remaining instead of three between the read-out pulses $R_{p-2}$ and $R_1$ including the excess time slot therebetween.

Referring again to FIGS. 4 and 5, as well as FIG. 3, it is to be pointed out at first that the ambiguity in phase relative to the input clock pulse series 12 of an output timing pulse series produced by the voltage controlled oscillator 27 is at most $-\pi$ or $\pi$ in terms of the angular frequency of the input clock pulses 12 even before the output timing pulse series is locked to the phase of the input clock pulse series 12 so as to become the output clock pulse series 17. Inasmuch as the phase of the write-in pulse trains 21 to 23 and read-out pulse trains 36 to 38 are controlled by the first and second control pulses 51 and 52 produced with reference to the frame pulses 29, the phase difference $\phi$ is at most $-\pi$ or $\pi$ even before the pull-in. This is a marked improvement over the ambiguity between $-3\pi$ and $3\pi$ of the phase difference between the write-in and read-out pulse trains 23 and 38 used in the example illustrated with reference to FIG. 1. In addition, the phase lock means controlled according to this invention always carries out negative feedback to the voltage controlled oscillator 27 with the phase shifter 41 preadjusted so that the phase difference of the phase-shifted write-in pulse train 43 relative to the read-out pulse train 38 may be between $-\pi$ and $\pi$ at the input of the phase comparator 45.

Figure 6:
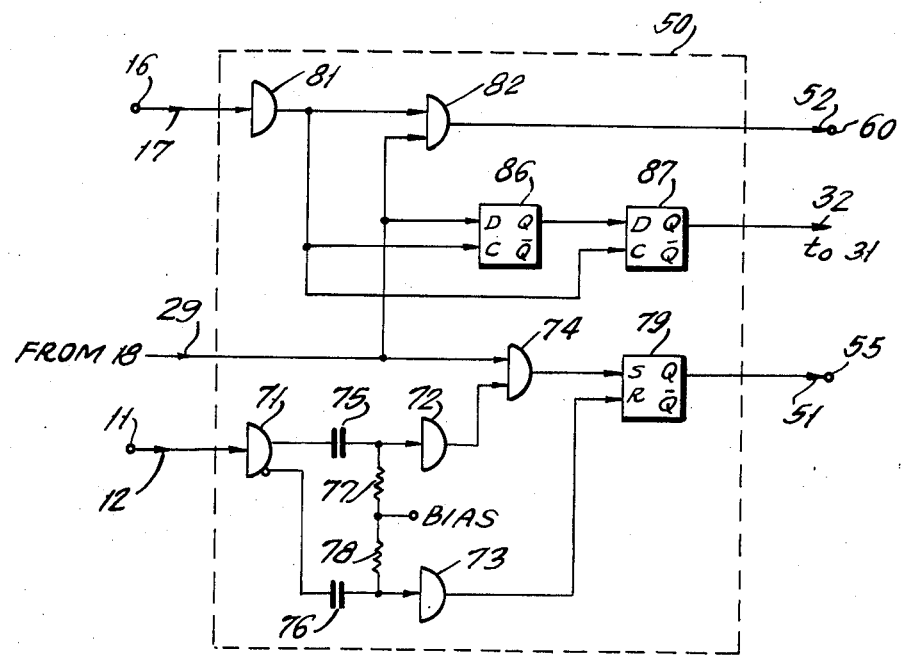
FIG. 6 is a block diagram of an example of control pulse generators for use in rate converters according to this invention.

Referring finally to FIG. 6, it is presumed here that the number p of the first time slots in each frame period is large enough to render the first time slots approximately equal to the second time slots. The control pulse generator 50 comprises a combination of an AND-NAND circuit 71, AND circuits 72, 73 and 74 (72 and 73 functioning as invertors), capacitors 75 and 76, resistors 77 and 78, and a D-type flip-flop circuit 79 connected as shown, together with a terminal BIAS for supplying a bias voltage to a differentiating circuit comprising the capacitor and resistor elements 75 to 78. Responsive to the input clock and frame pulses 12 and 29, the combination produces the first control pulse train 51 in the manner described hereinabove. The pulse generator 50 further comprises AND circuits 81 and 82 (81 operating as an invertor) responsive to the output clock and frame pulses 17 and 29 for producing the second control pulse train 52 also in the manner already described. Means for supplying the frame or timed pulses 29 to the INHIBIT gate 31 as the inhibit pulses 32 is depicted for the convenience of illustration in the pulse generator 50 and comprises D-type flip-flop circuits 86 and 87 for giving a delay of one second time slot to each of the timed pulses 29 to produce the inhibit pulses 32. Even when it is impossible to deem the first time slot to be approximately equal to the second time slot, it is possible with the frame counter 28 to produce frame pulses 29 of a duration substantially equal to the first time slot.

It will readily be understood from the above that this invention is equally applicable to a rate converter for digital signals wherein the number q of the excess time slots in each frame period is greater than unity. At any rate, the number M of the memory locations of the memory 26 should be greater than the number q. The control pulses 51 and 52 may be produced with reference to specific ones of the timed pulses 29 that are produced by the counter 28 one in each frame period with a duration of substantially one first time slot given thereto and with a space of one frame period remaining from the specific pulse produced in the adjacent frame period. Even when the number M of the memory locations can not be made equal to an integral multiple of the number p of the first time slots in each frame period, it is to be pointed out that the numbers p and M are integers and consequently have a least common multiple. IN this event, the control pulse generator 50 may be modified so as to control the phase lock means once for a plurality of the first time slots, equal in number to the least common multiple. Alternatively, the pulse generator 50 may be modified so as to produce the control pulses 51 and 52 only when an input clock pulse series 12 is newly supplied to the clock input terminal 11 and to produce no control pulses 51 and 52 thereafter. Furthermore, the input digital signal series 14 may consist of a plurality of series of independently varying input digital signals. Incidentally, it will be readily understood that the phase lock means carries out negative feedback to the voltage controlled oscillator 27 in a range between $\pi$ and $5\pi$ of the phase difference $\phi$ when the characteristic of the phase comparator 45 is reversed with respect to that illustrated in FIG. 3.

What is claimed is:

1. Apparatus responsive to a series of input clock pulses specifying first time slots and a series of input digital signals supplied to said apparatus at the respective first time slots, said input digital signals being representative of information being transmitted, for producing a series of output clock pulses defining second time slots including excess time slots and a series of output digital signals at respective ones of said second time slots less said excess time slots, a predetermined number of the excess time slots being provided in each predetermined period of time, said predetermined number being at least one, the second time slots in said predetermined period less the at least one excess time slot being equal in number to the first time slots in said predetermined period, said output digital signals being representative of said information, said apparatus comprising:

a memory having memory locations greater in number than said predetermined number;

a first frequency divider responsive to said input clock pulses for supplying frequency-divided input clock pulse trains, equal in number to the number of said memory locations, to said memory as write-in pulse trains to store the input digital signals in locations of said memory determined by pulse trains;

a second frequency divider responsive to a series of input timing pulses for supplying frequency-divided timing pulse trains, equal in number to the number of said memory locations, to said memory as read-out pulse trains to make said memory produce the output digital signals;

a voltage controlled oscillator for producing a series of output timing pulses approximately at the respective second time slots;

a counter responsive to said output timing pulses for producing a series of timed pulses for identifying said excess time slots;

inhibit means responsive to said output timing pulses and a series of inhibit pulses for supplying said input timing pulses to said second frequency divider;

means for supplying said timed pulses to said inhibit means as said inhibit pulses; and phase lock means responsive to a difference in phase between said write-in and read-out pulse trains for controlling said voltage controlled oscillator to produce said output timing pulses as said output clock pulses;

wherein the improvement comprises:

control means coupled to said first and second frequency dividers and responsive to said input clock, output timing, and timed pulses for maintaining said phase difference within a predetermined range which will cause said phase lock means to always carry out negative feedback to said voltage controlled oscillator.

2. The apparatus as claimed in claim 1, wherein said counter comprises means for producing a specific pulse as one in said each predetermined period of said timed pulses, each of the specific pulses having a duration of substantially one first time slot and spaced from an adjacent one of said specific pulses by said predetermined period, each of said input clock pulses having a specific point, wherein said control means comprises:

first pulse generator means responsive to said input clock and specific pulses for producing those of said input clock pulses as first control pulses, each of which has said specific point in the duration of said specific pulse;

second pulse generator means responsive to said output timing and specific pulses for producing those of said output timing pulses as second control pulses which are substantially coincident with said specific pulses; and preset means coupled to said first and second frequency dividers and responsive to said first and second control pulses for presetting said first and second frequency dividers, respectively, to control the phase difference to lie within said predetermined range.

3. The apparatus of claim 2, wherein:

said first frequency divider comprises first bistable circuits each associated with one of said memory locations, respectively, and being cyclically settable by the specific points of said input clock pulses to supply the write-in pulses to said memory locations, thereby storing the input digital signals in said memory locations;

said second frequency divider comprises second bistable circuits each associated with one of said memory locations, respectively, and being cyclically settable by said input timing pulses to supply the read-out pulses to said memory locations, thereby making said memory locations produce the output digital signals; and said preset means comprises:

first preset means coupled to said first bistable circuits and responsive to said first control pulses for presetting a predetermined one of said first bistable circuits; and second preset means coupled to said second bistable circuits and responsive to said second control pulses for presetting one of said second bistable circuits, said one second bistable circuit being related to said predetermined first bistable circuit to place the phase difference within said predetermined range.

4. The apparatus of claim 3, wherein said connection means comprises means for providing a delay of one second time slot to each of said timed pulses to produce said inhibit pulses.

5. A rate converter for increasing the number of time slots during which digital signals may be present between the input and output thereof comprising:

memory means having a plurality of storage locations for storing time digital signals;

input timing signals for determining the rate of occurrence of the digital signals;

read in means responsive to the input timing signals for storing the digital signals in the memory means;

adjustable oscillator means for generating output timing signals at a frequency approximately equal to the desired output frequency which is greater than the frequency of input timing pulses;

read out means responsive to the oscillator means for reading the stored digital signals out of said memory means during less than all of the time slots present in the output timing signals;

means coupled to said oscillator means for detecting when the number of output time slots exceeds the number of time slots in the input timing signals to generate an inhibit enabling signal;

means responsive to the presence of an inhibit signal to prevent said read-out means from reading digital signals out of the memory means during the occurrence of an inhibit signal;

means for comparing the phase relationship between one of the read-in signals and an associated one of the read-out signals for adjusting said oscillator means to lock into the desired phase relationship the improvement comprising:

means responsive to the input and output timing signals and the inhibit enabling signals for presetting said read-in and read-out means to maintain said phase relationship within a predetermined range so that adjustment of said oscillator means is always by way of a negative feedback signal.

6. The means of claim 5 further comprising means for delaying the inhibit pulses present to said read-out means by a time interval equal to the length of an output signal time slot.

* * * * *